United States Patent [19]

Goodrich et al.

[11] 4,451,948

[45] Jun. 5, 1984

[54] WIRE STRIPPING TOOL

[75] Inventors: Robert R. Goodrich; Charles L. Krumreich, both of Indianapolis; Robert J. O'Connor, Greenfield, all of Ind.

[73] Assignee: Bell Telephone Laboratories, Incorporated, Murray Hill, N.J.

[21] Appl. No.: 363,506

[22] Filed: Mar. 30, 1982

[51] Int. Cl.³ .................... B25F 1/00; H02G 1/12; B26B 27/00

[52] U.S. Cl. ............................ 7/107; 81/9.5 R; 30/91.2

[58] Field of Search ........... 81/9.5 R, 9.5 C; 7/107; 30/90.1, 91.2, 90.6, 91.1; 24/255 SL, 255 R, 258; 292/87, 80, 89, 19

[56] References Cited

U.S. PATENT DOCUMENTS 3,254,407 6/1966 Apa et al. .................... 30/91.2
3,800,418 4/1974 Schlueter .................... 30/91.2
4,130,031 12/1978 Wiener et al. ................ 81/9.5

Primary Examiner—Roscoe V. Parker
Attorney, Agent, or Firm—H. L. Newman

[57] ABSTRACT

A tool for stripping insulation from coaxial or multiple conductor cables is disclosed. The tool consists of a support assembly (1) with an integrally connected spring (5) which swivels between an up and down position. The support assembly (1) contains a channel (2) which runs along its length where the spring (5) rests in its down position. A semicircular slot (4) receives the insulated cable. Embedded within support assembly (1) is a knife blade (7), a portion of which is exposed in the slot (4). The knife blade penetrates the insulation when the spring (5) is in its down position causing an incision through the insulation. A ring is placed at one end of the tool in which the user can insert a finger and thereby twirl the tool around to effect relative rotation of the tool and cable to cut through the cable over its entire circumference.

6 Claims, 7 Drawing Figures

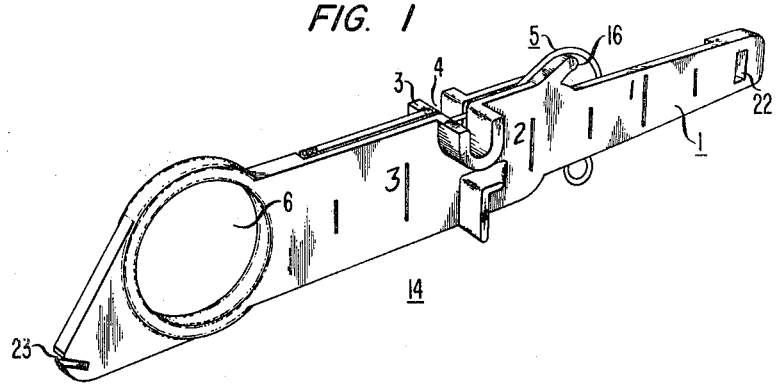
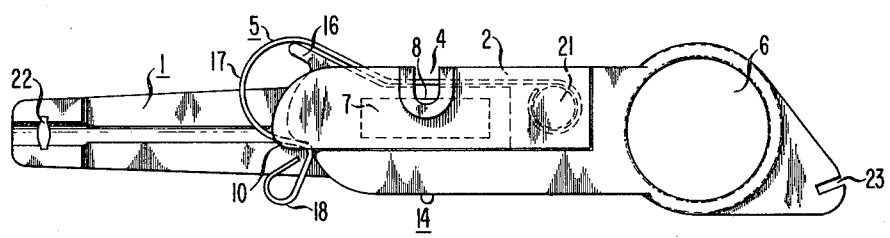
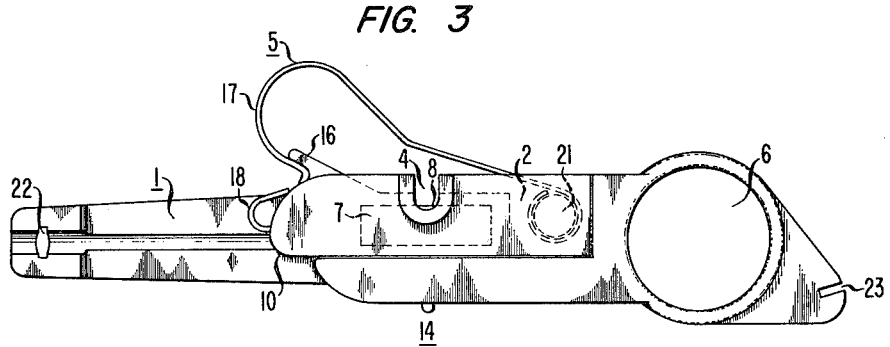

WIRE STRIPPING TOOL

FIELD OF THE INVENTION

This invention relates generally to tools for stripping insulation from coaxial or multiple conductor cables and more particularly to a tool that can be used to strip insulation from cables used in telephone systems.

BACKGROUND OF THE INVENTION

Wire stripping tools are utilized extensively in removing the insulation from multiple conductor or coaxial cables. These tools take on many different kinds of configurations dependent upon the type of cable being stripped. A tool which has found use in this regard is described in U.S. Pat. No. 4,130,031 issued on Dec. 19, 1978 by Wiener et al. This tool is small and compact but it is a complicated tool that requires several interactive parts. Furthermore, adjustments are required on the above-described tool to insure that the proper cutting depth of the knife blade is attained.

Wire-stripping tools are utilized extensively in the installation of telephone equipment in a home or business environment. In addition, more and more customers are installing telephone equipment within their establishments themselves. Therefore, a need has arisen for a tool that can be utilized in a simple fashion to install telephone wiring within the home or business environment. Furthermore, the tool should be one which is compact (i.e. can be carried around in the pocket of the user), and is safe to use and also safe to carry. Finally, the tool should be relatively inexpensive so that it is readily obtainable by the customer.

Our invention is a tool for stripping insulation from multiple conductor or coaxial cable that is simple, easy to use, portable, safe to use and carry. This invention also is a tool for stripping insulation from a multiple conductor and or coaxial cable which is relatively inexpensive. Finally, our invention is a tool for stripping insulation from multiple conductor and/or coaxial cables that can be easily used by the average consumer.

SUMMARY OF THE INVENTION

An embodiment of our invention comprises an assembly made of a light weight material with a knife blade embedded within it. There is a slot in the assembly that retains the knife blade such that a portion of the knife blade is exposed. In addition this slot receives the insulated cable to be stripped. A compliant member preferably made from a resilient spring is connected to the assembly. This spring performs two functions: (1) it holds the insulated cable within the slot of the assembly and (2) it forces the cable against the knife blade to facilitate cutting an incision in the insulation.

The spring is attached to the support assembly such that it can be moved from a position above the slot, which position allows the cable to be placed in the slot, to a position where the cable is biased against the knife blade in the slot. Thus, by the application of pressure of the spring against the insulated cable the knife blade penetrates the insulation. This embodiment contains a ring or eye in which the user can insert a finger and thereby twirl the tool around to effect relative rotation of the tool and cable to cut through the insulation over its entire circumference. Thereafter the cable can be pulled away from the tool thus removing the insulation therefrom.

BRIEF DESCRIPTION OF THE DRAWING

FIG. 1 is a perspective view of an embodiment of the invention;

FIG. 2 is a side view of the embodiment;

FIG. 3 is a side view of the embodiment with the spring in the up position to accept an insulated cable;

DETAILED DESCRIPTION

Figure 4:
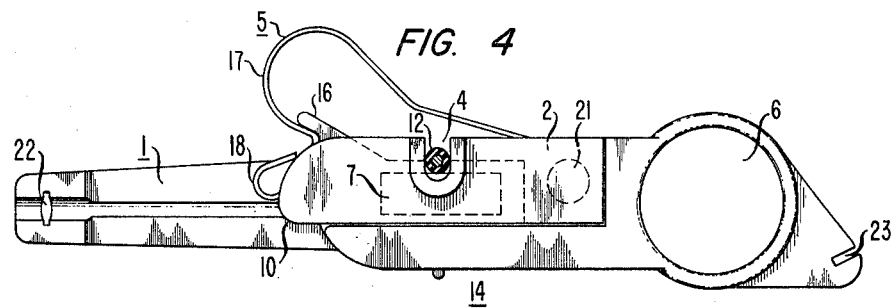
FIG. 4 is the same as FIG. 3 with the insulated cable in place.

FIG. 1 is a perspective view of one embodiment of a tool 14 in accordance with the present invention. Tool 14 can be utilized to strip the insulation from coaxial or multiple conductor cables dependent upon the size of the cable to be stripped. The construction and operation of the tool will become apparent to those skilled in the art with the following description in conjunction with FIGS. 2 through 7.

FIG. 2 is a side view of the cable stripping tool. The tool comprises a support assembly 1 which can be made from a variety of materials. Plastic such as polycarbonate may be appropriate as it is lightweight and can easily be formed into the desired configuration through a molding operation. Support assembly 1 has a channel 2 (shown by dotted line) running along its length to accept a retaining spring 5. Spring 5 has a loop portion 17 and a re-entrant latch portion 18 on one end for retaining the spring 5 in either an up or a down position. The spring 5 in the down position as in FIG. 2 rests in the channel 2.

Figure 6:
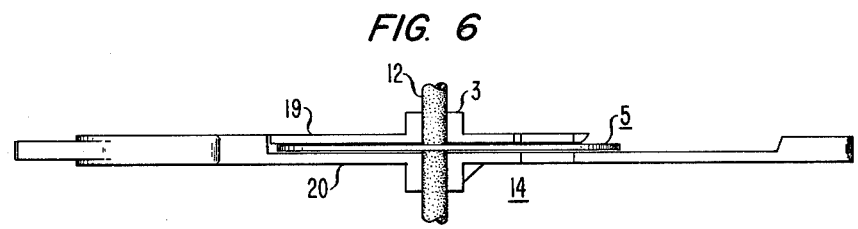
FIG. 6 is a top view of the embodiment of the invention.

The spring 5 is an integral part of the support assembly 1 and is connected to and encased by the support assembly such that it cannot be removed. The tool 14 in this embodiment is made in two halves 19 and 20 (FIG. 6). The spring 5 is sandwiched therebetween. Thereafter the halves 19 and 20 are joined together by ultrasonic welding or some other joining technique thereby trapping the spring between the halves at the point shown by the dotted line 21. The spring 5 can then swivel easily from a position above the channel 2 to a position in the channel. The retaining spring 5 can be made of any compliant material that will exert some pressure on the cable while the insulated cable rests in semicircular slot 4 formed in a laterally extending flange 3 (FIG. 1). Semicircular slot 4 accommodates the insulated cable to facilitate the stripping operation.

Embedded within the support assembly is knife blade 7 having a portion 8 within slot 4 that is exposed such that it can penetrate the insulation of the cable positioned within the slot when sufficient pressure is applied to the cable. The blade 7 of the support assembly 1 is trapped in much the same manner as spring 5. At one end of support assembly 1 is a ring 6 for allowing the user to twirl the tool on his or her finger to effect relative rotation of the tool and cable.

In FIG. 2, the retaining spring 5 is in the "down" position. Thus, the tool can be carried in the hand or on the person of the user safely as it is virtually impossible for the user to be exposed to the sharp knife edge of the tool. The spring 5 is retained in the down position in this embodiment by the interaction of the latch portion 18 with the underside of a protrusion 10 on the support assembly 1, the latch portion being biased against the protrusion by the loop portion 17. Protrusion 10 in this embodiment is a semicircular hub which latch portion 18, due to the loop portion's 17 compliant qualities, snaps around and is locked in place. The spring 5, therefore, will not move from its position (down) unless an outward force (in this case to the left) is applied to the latch portion 18 of spring 5.

FIG. 3 is the inventive embodiment with the spring in the "up" position, thereby allowing for insertion of the insulated cable in the slot 4. The spring 5 remains in the "up" position because the latch portion 18 is captured between the upper surface of the protrusion 10 and an ear 16 extending outwardly adjacent to the upper surface. The loop portion 17 biases the latch portion 18 into the recess between these two elements. In addition, ear 16 prevents this end of spring 5 from swinging freely above the tool 5.

Figure 5:
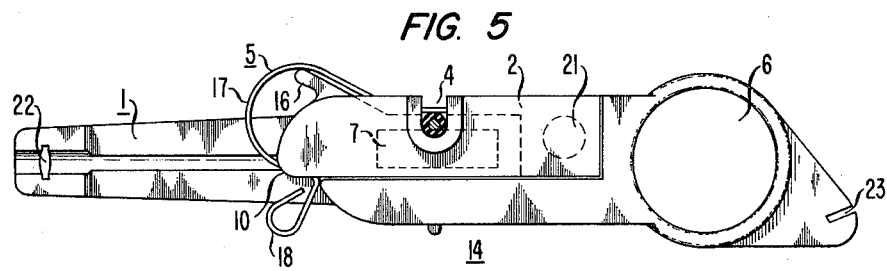
FIG. 5 is the same as FIG. 3 with the spring in the down position.

FIG. 4 shows the cable 12 located within the slot 4 of the tool. As is readily apparent, the exposed portion 8 of the knife blade 7 is in contact with the insulation of cable 12. Thereafter the spring 5 is pushed down to bias the cable against the exposed portion 8 of the knife blade 7 and to apply pressure thereto. FIG. 5 shows the spring 5 in the down position with the knife blade cutting through the insulation of the cable 12. As stated above, the interaction between the latch portion 18 and the protrusion 10 holds the spring 5 in position. The user can then insert his or her finger into ring 6 and thereafter twirl or rotate the tool around to effect relative rotation of the tool 14 and the cable 12 to cut through the insulation over its entire circumference.

After the insulation is cut, then the cable 12 is pulled out of the tool while the spring 5 is still clamping the cable such that the insulation is stripped from the cable and the core of multiple cables are exposed.

Spring 5 therefore performs two functions:
1. it holds the cable within the slot of the assembly, and
2. it also biases the cable against the knife blade so as to keep pressure thereon.

Spring 5 furthermore can be made from a material that is flexible enough to accommodate varying sizes or gauges of cable.

Figure 7:
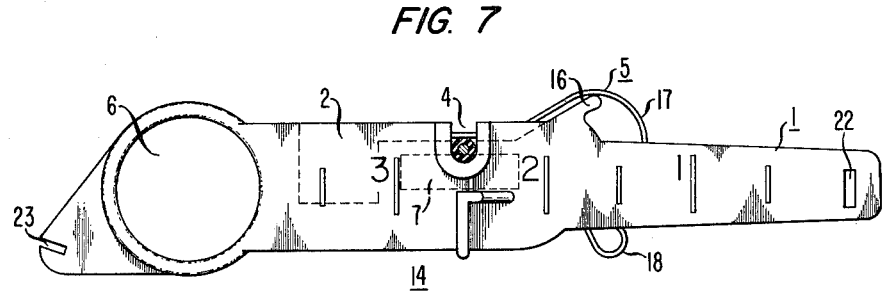
FIG. 7 is the opposite side of the tool of FIG. 6.

FIG. 6 is a top view of the inventive embodiment which shows a portion of the wire stripping tool 14 that accommodates the insulated cable 12. It can be seen from this Figure that the spring 5 is over the cable, therefore holding the cable in position. Turning to FIG. 7, a scale is provided that is used to measure the length of cable to be stripped. The numbers 1 through 3 are designated, and it should be noted in this embodiment these numbers correspond to inches of cables to be measured. However, these markings can be any unit of measure. After, an insulated cable is measured to determine the amount of insulation that is to be removed, the insulation stripping operation can take place to allow the cable to be connected to its terminal point.

In addition, the tool 14 has a rectangular hole 22 at one end to position staples (not shown) that will be used for nailing cable to a baseboard, etc. A staple is held in the hole 22 by friction, and thus the staple can be hammered into place without having to be held by the fingers of the user. Finally, the tool 14 has a notch 23 at its other end to break out a thin section in the side wall of a surface mounted connecting block to provide an opening through which a cable can pass. Such a connecting block is used to electrically connect telephone equipment to the cable.

Therefore, the wire stripper of FIGS. 1 through 7 is a multipurpose tool that can be used to accomplish four tasks:
1. measuring the insulated cable,
2. stripping the insulation from the cable,
3. stapling the cable in place, and
4. providing a passageway in a connecting block for the cable.

The tool, described in the above-mentioned Figures, will find use extensively in the telephone industry. With consumer installation of telephone equipment increasing, this will be a useful, safe and simple to use tool that is a helpful addition to any package of tools to be used in conjunction therewith. In addition, this tool can accommodate varying cable sizes dependent upon the compliancy of the spring that holds the insulated cable in the body of the tool. Typically, this cable stripper could be part of a package of simple to use tools to install telephones or telephone systems.

While this invention has been disclosed by means of specific illustrative embodiments, the principles thereof are capable of a wide range of modification by those skilled in the art within the scope of the following claims. Thus, while the spring 5 and knife blade 7 have been disclosed as discrete components mounted on the support assembly 1, the support assembly could be molded as a unitary member that includes these elements.

What is claimed is:

1. A tool for stripping insulation from an insulated cable comprising:
   support means including means for accommodating the insulated cable;
   means extending into the cable accommodating means for cutting an incision in the insulation of an insulated cable positioned in the cable accommodating means; and
   resilient means supported on the support means;
   the resilient means including means for cooperating with the support means to retain the resilient means in either a first or a second position with respect to the support means, the resilient means in the first position being spaced from the cable accommodating means to facilitate the positioning of an insulated cable in the cable accommodating means and in the second position both holding an insulated cable in the cable accommodating means and biasing the cable against the cutting means.

2. A tool for stripping insulation from an insulated cable comprising:
   a support member including a slot for accommodating the insulated cable;
   a cutting surface extending into the slot for cutting an incision in the insulation of an insulated cable positioned within the slot; and
   a spring member joined to the support member and including a re-entrant latch portion extending into engagement with the support member, the spring member moving between a first and second position, the support member deflecting the latch portion outwardly as the spring member moves between the first and second positions and permitting the latch portion to move inwardly in the first and second positions whereby the spring member is retained in either the first or the second positions, the spring member in the first position being spaced from the slot to facilitate the positioning of an insulated cable in the slot and in the second position both holding the insulated cable in the slot and biasing the cable against the cutting surface.

3. A tool for stripping insulation from an insulated cable comprising:
- a support member including a slot for accommodating the insulated cable and an outwardly curving protrusion spaced from the slot;
- a cutting surface extending into the slot for cutting an incision in the insulation of an insulated cable positioned in the slot; and
- a spring member having one end mounted on the support member, the other end of the spring member including a compliant loop portion and a re-entrant latch portion for engaging the protrusion as the spring member moves between a first stable position wherein the latch portion is located about the protrusion and a second stable portion wherein the latch portion is located below the protrusion, the spring member in the first position being spaced from the slot to facilitate the positioning of the insulated cable in the slot and in the second position both holding the insulated cable in the slot and biasing the cable against the cutting surface.

4. A tool for stripping insulation from an insulated cable comprising:
- a support member including a slot for accommodating the insulated cable, a convex protrusion spaced from the slot, and a recess above the protrusion;
- a cutting surface extending into the slot for cutting an incision in the insulation of an insulated cable positioned within the slot;
- a spring member having one end mounted on the support member, the other end of the spring member including a compliant loop portion and a re-entrant latch portion, the spring member being mounted so as to swivel between a first stable position in which the latch portion engages the recess and a second stable position in which the latch portion engages in an underside of the protrusion, the spring member in the first position being spaced from the slot to facilitate the positioning of an insulated cable in the slot and in the second position both holding the insulated cable in the slot and biasing the cable against the cutting surface.

5. A tool as in claim 4 wherein the support member further includes an ear located above the protrusion for engaging the latch portion, the ear preventing the spring member from swiveling freely above the tool.

6. A tool as in claim 4 wherein the support member further includes means for holding a staple that is used for mounting the cable on a surface.

* * * * *